June 10, 1930.  H. G. SCHWARZ  1,762,593
SEPARATOR
Filed Nov. 15, 1927    2 Sheets-Sheet 1
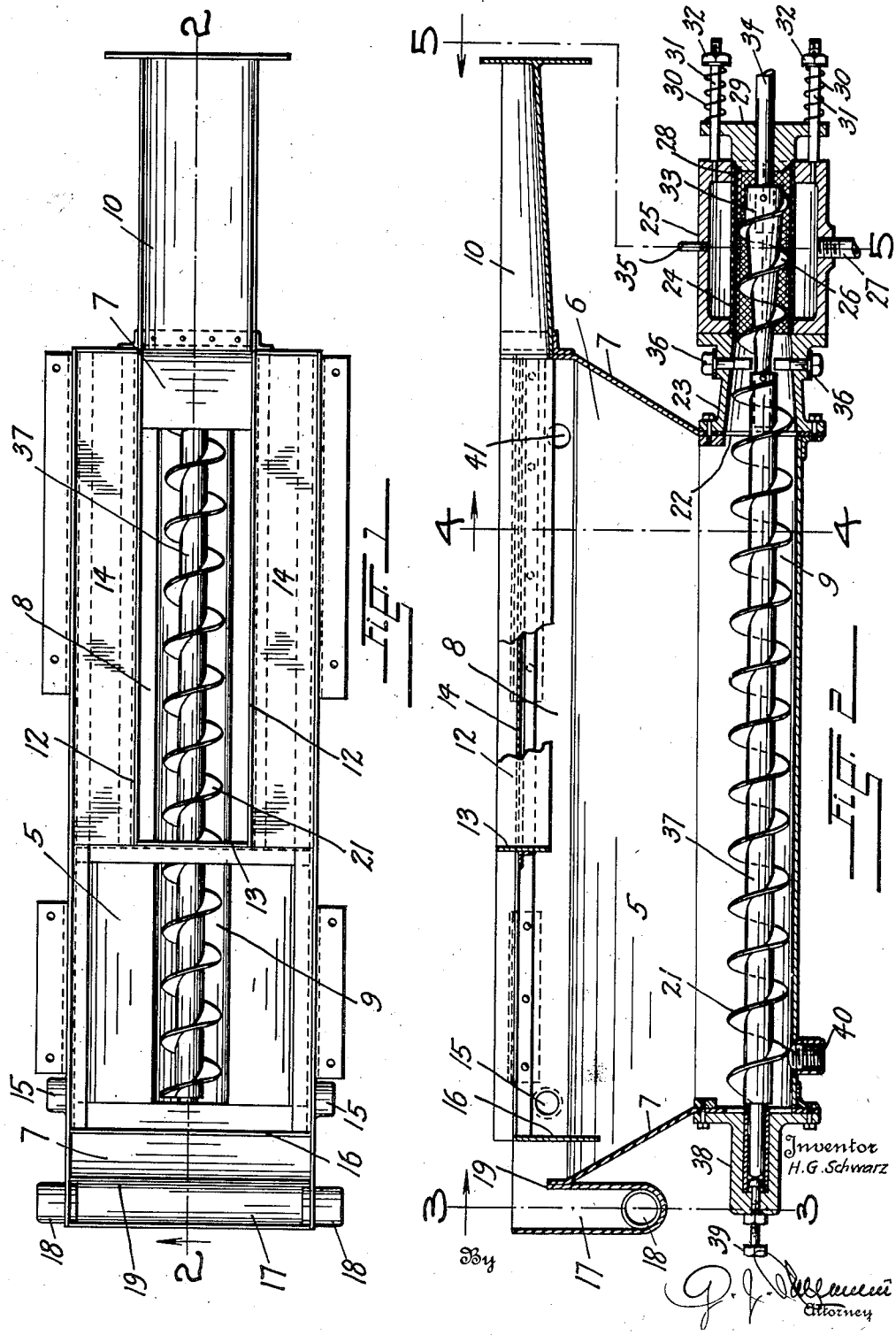
Inventor
H. G. Schwarz June 10, 1930.  H. G. SCHWARZ  1,762,593
SEPARATOR
Filed Nov. 15, 1927    2 Sheets-Sheet 2
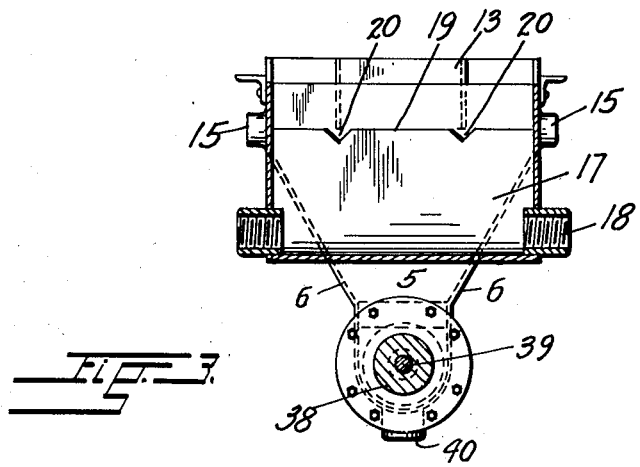
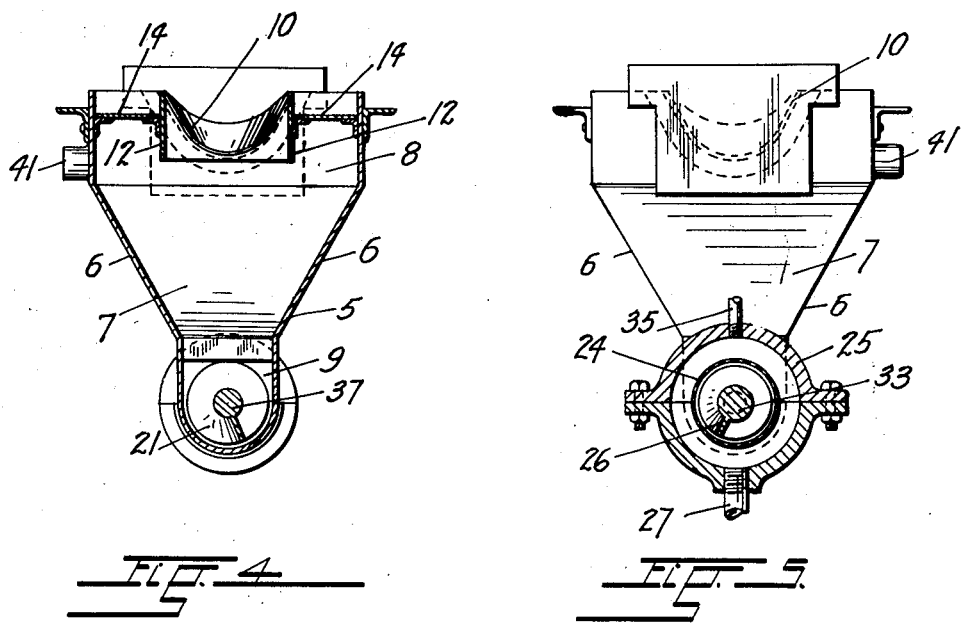
INVENTOR.
H. G. Schwarz
BY
ATTORNEY.

Patented June 10, 1930

1,762,593

UNITED STATES PATENT OFFICE

HENRY G. SCHWARZ, OF DENVER, COLORADO

SEPARATOR

Application filed November 15, 1927. Serial No. 233,399.

This invention relates to separators and more particularly to an apparatus for the separation of oil and solids from water in liquids obtained from the process of extracting liquids from fish and kindred materials.

It is an object of the present invention to provide a separator of very simple construction in which settled solids are continuously discharged by a suitable conveyer.

Another object is to provide in association with the separator, means for expressing liquid from the discharged solids. Another object is to operate the expressing means in conjunction with the conveyer.

Further objects are to provide means for the separate discharge by overflow, of oil and water and to provide means to expedite the settling action by opposing agitation and still other objects reside in details of construction and a novel arrangement of parts as set forth in the following description.

In the accompanying drawings,

Figure 1 represents a plan view of the separator,

Figure 2, a longitudinal section along the line 2—2 Figure 1,

Figure 3, a vertical transverse section taken on the line 3—3, Figure 2,

Figure 4, a similar section along the line 4—4, of Figure 2, and

Figure 5, a similar section on the line 5—5, Figure 2.

Similar characters of reference designate corresponding parts throughout the views.

Referring to the drawings, a tank 5 of oblong form has side walls 6 and end walls 7 slanting convergingly from a rectangular top section 8 to a trough-shaped bottom section 9. At one end of the section 8 is an extension 10 which serves merely to receive the feed of a superposed device extending beyond the separator.

In the feed end portion of the upper section of the tank is a rectangular frame which provides two baffles 12 extending parallel and in spaced relation to the sides of the section, and a transverse baffle 13 connected across the other baffles at the ends thereof. The spaces between the longitudinal baffles and the sides of the top section are covered by plates 14 so that material fed from a superposed machine into the separator must fall into the rectangular space defined by the baffles.

Approximately on a line with the lower edges of the baffles are outlet openings 15 formed opposite to each other in the sides of the tank for the discharge of oil by overflow, and rearward of these openings, with respect to the movement of liquid in the operation of the machine, is a transverse baffle 16 which extends into the tank to a depth considerably below the level of the openings.

At the rear end of the tank is a water outlet, preferably provided by a sump 17 having openings 18 at its ends which are in line with the sides of the tank.

The end wall of the tank between the water outlet and the baffle, is reduced in height to provide an overflow edge 19 approximately in line with the lower edges of the baffles 12 and 13. The edge has one or more V-shaped notches 20 which provide channels through which the water may flow before it reaches the level of the top of the overflow.

It will be apparent that the notches automatically regulate the discharge of water according to the amount fed into the machine, since the area of the passage or passages provided by the notches, through which the water flows is increased or decreased in ratio to the level of the liquid in the tank.

If the feed of material is very heavy the liquid may flow across the top of the overflow but under normal conditions it passes through the V-shaped notches as stated hereinbefore.

Mounted for rotation in the trough-shaped bottom section of the tank, is a screw conveyer 21 which moves the solid matter settling out of the liquid, to a point of discharge at an end of the tank. The solids conveyed by the screw pass through an opening 22, at an end of the trough, into a tapering reducer 23 and thence into a press in which liquid remaining in the discharged matter is separated from the solids.

The press as shown in the drawings, consists of a cylindrical screen 24 inside a housing 25. A screw conveyer 26 preferably continuous with the screw conveyer 21 works in the screen for the purpose of expressing the liquid contained in the material conveyed by the last-mentioned screw.

The liquid passes through the screen into the housing and is discharged through an outlet 27 in the bottom of the latter, and the solids are compelled to pass through an annular space between the edge of an opening 28 at the end of the screen, and a head 29, against the resistance of springs 30 which tend to move the head into contact with the edge.

The springs are preferably coiled around rods 31 extending from the housing through apertures in a flange of the head, and abut upon nuts 32 screwed upon the ends of the rods.

The screw blade of the press is wound helically around a tapering body 33 mounted on the shaft 34 of the conveyers, whereby the material is subjected to gradually increasing pressure as it advances through the press.

An outlet 35 at the top of the housing provides for the escape of gases. Pins 36 fastened on the reducer 23 extend into close proxmity to the body of the screw conveyer 26 to prevent the material from turning with the conveyer as it passes into the press and the end portions of the pins are preferably flattened to present a sharp edge to the advancing material.

The screw conveyer 21 is preferably composed of a cylindrical body 37 mounted on the before mentioned shaft and carrying a helical blade which peripherally extends in close proximity to the bottom of the trough. The shaft projects into a head 38 fixed at one end of the trough and through the head of the press at the opposite end of the same. The shaft is further supported in a bearing exteriorly of the press, and a set screw 39 on the head regulates the resistance of the thrust.

A pulley or gear wheel on the shaft connects with a driving element, but the transmission members have not been shown in the drawings. Their construction is obvious and not a part of the present invention.

An outlet 40 in the bottom of the trough normally closed by a screw plug, facilitates drainage in cleaning the machine and an opening 41 in a side of the tank at the feed end thereof permits of the connection of a feed conduit from a distant source of supply.

In the operation of the separator the material is fed onto the extension 10 whence it passes into the box shaped baffle structure, or/and directly into the rectangular space between the baffles. The longitudinal baffles restrain sideways movement of the material fed into the space and the transverse baffle restricts the movement of the liquid to the discharge end of the machine.

The material thus is brought to a state of comparative quietude with the result that the solids in the material settle readily out of the liquid before the latter reaches the overflow outlets at the discharge end of the tank.

The settling solids fall into the trough-shaped bottom section of the machine and are constantly conveyed to the press by the continuously rotating conveyer.

The press extracts the liquid from the solid matter in the discharge, the liquid passing through the screen of the press into the housing and the dry solids moving through the annular space between the edge of the opening at the end of the press and the head 29 which is forced outwardly against the pressure of the springs.

The pins 36 assist the operation of the press by holding the material against rotation with the conveyor as hereinbefore explained.

The material fed into the separator from a press used in the extraction process is in the nature of an emulsion which contains in addition to the meal which is precipitated to the bottom of the tank, an oil which must be separated from the water for its use in various ways. The baffle 16 rearward of the outlets 15 retards the flow of liquid to the sump 17 and thereby gives the oil rising to the level of the water, the opportunity of overflowing through the outlets.

The water free from oil and solids or at least with a small percentage of oil and solids, flows around the lower edge of the baffle 16 and passes across the weir 19 into the sump 17 whence it is discharged through the outlets 18 for further treatment if necessary.

The function of the V-shaped passages in the edge of the weir has been fully explained hereinbefore and requires no further description at this point. It is to be understood that variations in the specific construction and the arrangement of the parts comprised in the separator as shown and described may be resorted to without departing from the spirit of the invention.

Having thus described my invention, what I claim and desire to secure by Letters Patent is:—

1. A separator of the character described comprising a settling tank and in the upper portion thereof, a baffle structure adapted to bring material fed into the tank, to a state of comparative quiet, the tank having beyond the structure, an overflow for oil and an overflow for water.

2. A separator of the character described comprising a settling tank, and in the upper portion thereof, longitudinal baffles and a transveres baffle providing a space to receive the feed, the tank having an overflow beyond the baffles.

3. A separator of the character described comprising a settling tank, and in the upper portion thereof, longitudinal baffles and a transverse baffle forming a box-like structure, providing a space to receive the feed, the tank having an overflow beyond the baffles.

In testimony whereof I have affixed my signature.

HENRY G. SCHWARZ.